(12) United States Patent
Olsen

(10) Patent No.: US 6,296,226 B1
(45) Date of Patent: Oct. 2, 2001

(54) FLUID METERING SYSTEM

(75) Inventor: Gregory A. Olsen, Tempe, AZ (US)

(73) Assignee: SpeedFam-IPEC Corporation, Chandler, AZ (US)

(*) Notice: Subject to any disclaimer, the term of this patent is extended or adjusted under 35 U.S.C. 154(b) by 0 days.

(21) Appl. No.: 09/692,562

(22) Filed: Oct. 19, 2000

(51) Int. Cl.$^7$ .............................. F16K 31/12; F16K 47/00
(52) U.S. Cl. .......................... 251/26; 251/30.01; 251/118
(58) Field of Search .................................. 251/26, 30.01, 251/118, 25

(56) References Cited

U.S. PATENT DOCUMENTS

| | | | |
|---|---|---|---|
| 3,880,178 | * | 4/1975 | Panissidi ................................. 137/14 |
| 4,065,094 | * | 12/1977 | Adams ..................................... 251/26 |
| 5,181,538 | * | 1/1993 | Manganaro ........................... 137/607 |
| 5,520,206 | * | 5/1996 | Deville .................................... 137/12 |

* cited by examiner

Primary Examiner—Kevin Shaver
Assistant Examiner—D. Austin Bonderer

(74) Attorney, Agent, or Firm—Snell & Wilmer, LLP

(57) ABSTRACT

A fluid metering apparatus includes a gas inlet, a first regulator in fluid communication with the gas inlet and configured to emit the gas at a first gas pressure, and a second regulator in fluid communication with the gas inlet and configured to emit the gas at a second gas pressure. A first valve is in fluid communication with the first regulator and a second valve is in fluid communication with the second regulator. A switch mechanism has two actuators which, when separately actuated, causes either the first valve to be open and the second valve to be closed or the first valve to be closed and the second valve to be open. The apparatus further includes a fluid pressure regulating device having a fluid inlet port which receives a fluid at a fluid inlet pressure, a gas inlet port and a fluid outlet port. The fluid pressure regulating device delivers the fluid to the fluid outlet port at a device outlet flow rate which is proportional to a predetermined ratio of the fluid inlet pressure and either the first gas pressure if the first actuator is actuated or the second gas pressure if the second actuator is actuated. The apparatus further includes a fluid outlet and an orifice fitting in fluid communication with the fluid outlet port and configured to effect a pressure drop between the fluid outlet port and the fluid outlet.

28 Claims, 4 Drawing Sheets

FLUID METERING SYSTEM

FIELD OF THE INVENTION

The present invention relates generally to systems for metering fluids. More particularly, it relates to an apparatus for the controlled delivery of fluids at low flow rates.

BACKGROUND OF THE INVENTION

Delivery devices for the delivery of fluids at predetermined flow rates are well known in the art. The delivery of fluids at rates of below approximately 30 milliliters per minute typically involve the use of devices such as syringe pumps. While such devices are suitable for regulating very low rates of flow, they generally are not adequate for flow rates above 30 milliliters per minute. The delivery of fluids at rates above approximately 200 milliliters per minute typically includes the use of flow meters. However, such devices are generally unsuitable for flow rates below 200 milliliters per minute. Thus, it is difficult to use conventional devices to produce flow rates in the range of approximately 30–200 milliliters per minute.

Conventional flow meters and pumps provide the additional disadvantage that such devices include moving elements involving chemicals that may interfere with the purity and chemical characteristic parameters required in certain industries, such as the semiconductor fabrication or medical industries. Noninvasive flow meters that do not interfere with the required purity and chemical characteristics parameters, such as vortex meters, Corioles meters, ultrasonic meters, magnetic flow meters and the like, are typically large, closed-loop units that take up valuable space.

Thus, there is a need for a compact, open-loop fluid metering device that is suitable for delivering fluid at constant rates in the range of approximately 30–200 milliliters per minute. There is a further need for a fluid metering device that will not interfere with the purity and chemical characteristic parameters of the fluid during flow.

SUMMARY OF THE INVENTION

These and other aspects of the present invention will become more apparent to those skilled in the art from the following non-limiting detailed description of preferred embodiments of the invention taken with reference to the accompanying figures.

In accordance with an exemplary embodiment of the present invention, a fluid metering apparatus for the delivery of a fluid at a desired flow rate uses air pressure to regulate the pressure of the fluid thereby regulating the fluid flow rate. The fluid metering apparatus includes a gas inlet and a first regulator in fluid communication with the gas inlet and configured to receive a gas from the gas inlet and emit the gas at a first gas pressure. A second regulator is in fluid communication with the gas inlet and configured to receive the gas from the gas inlet and emit the gas at a second gas pressure. A first valve is in fluid communication with the first regulator and a second valve is in fluid communication with the second regulator. A switch mechanism is connected to the first valve and the second valve and has a first actuator and a second actuator, wherein said switch mechanism causes the first valve to be open and the second valve to be closed when the first actuator is actuated and causes the second valve to be open and the first valve to be closed when the second actuator is actuated.

The apparatus also includes a fluid pressure regulating device which has a fluid inlet port configured to receive a fluid to be metered, wherein the fluid has a fluid inlet pressure. The fluid pressure regulating device also has a gas inlet port, in fluid communication with the first valve and the second valve, and a fluid outlet port. When the first actuator of the switch mechanism is actuated, the fluid pressure regulating device is configured to deliver the fluid to the fluid outlet port at a first device outlet flow rate which is proportional to a predetermined ratio of the fluid inlet pressure and the first gas pressure. When the second actuator of the switch mechanism is actuated, the fluid pressure regulating device is configured to deliver the fluid to the outlet port at a second device outlet flow rate which is proportional to a predetermined ratio of the fluid inlet pressure and the second gas pressure.

The apparatus further includes a fluid outlet and an orifice fitting which is in fluid communication with the fluid outlet port of the fluid pressure regulating device and is configured to effect a pressure drop between the fluid outlet port and the fluid outlet.

In accordance with another embodiment of the present invention, the fluid metering apparatus further has a fluid flow activation device which is configured to permit the fluid to flow from the fluid inlet port to the fluid outlet port when either the first actuator or second actuator is actuated.

In accordance with a further embodiment of the present invention, the fluid flow activation device has an activation valve, which is in fluid communication with the gas inlet and the fluid pressure regulating device and which is opened when either the first or second actuator is actuated.

In accordance with yet another embodiment of the present invention the switch mechanism has an electronic assembly which is configured to transmit a first electronic signal to the first valve when the first actuator is actuated and to transmit a second electronic signal to the second valve when the second actuator is actuated.

In accordance with yet a further embodiment of the present invention, the electronic assembly transmits the first electronic signal to the activation valve when the first actuator is actuated and the second electronic signal to the activation valve when the second actuator is actuated.

In accordance with another embodiment of the present invention, the second regulator may be in fluid communication with said first regulator gas-outlet and may be configured to receive the gas from the first regulator gas outlet and emit the gas at a second gas pressure, wherein the first gas pressure is higher than the second gas pressure.

In accordance with a further embodiment of the present invention, a fluid metering apparatus for the delivery of a fluid at one of N delivery pressures, wherein N is any integer greater than 1 and i is any number from 1 to N, includes a gas inlet for receiving a gas and N regulators. Each $N_i$ regulator is in fluid communication with the gas inlet and is configured to emit said gas at a corresponding $N_i$ gas pressure. The apparatus further includes N valves. Each $N_i$ valve is in fluid communication with a corresponding $N_i$ regulator. A switch mechanism is connected to each $N_i$ valve and has N actuators. The switch mechanism causes an $N_i$ valve to be opened and the remaining valves to be closed when an $N_i$ actuator is actuated. The apparatus further includes a fluid pressure regulating device. The fluid pressure regulating device has a fluid inlet port which is configured to receive a fluid to be metered, wherein the fluid has a fluid inlet pressure. The fluid pressure regulating device also has a gas inlet port in fluid communication with each $N_i$ valve and a fluid outlet port. When an $N_i$ actuator of the switch mechanism is actuated, the fluid pressure regulating device is configured to deliver the fluid to the fluid outlet port at a device outlet pressure which is proportional to a predetermined ratio of the fluid inlet pressure and the $N_i$ gas pressure which corresponds to the $N_i$ actuator that was actuated.

The apparatus further includes a fluid outlet which is configured to emit the fluid at an $N_i$ delivery flow rate and an orifice fitting which is in fluid communication with the fluid outlet port and configured to effect a pressure drop between the fluid outlet port and the fluid outlet.

BRIEF DESCRIPTION OF THE DRAWING FIGURES

Exemplary embodiments of the present invention will hereafter be described in conjunction with the appended drawing figures, wherein like designations denote like elements, and:

FIG. 3b is a front view of the orifice fitting shown in FIG. 3a; and

DETAILED DESCRIPTION OF THE INVENTION

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth.

Figure 1:
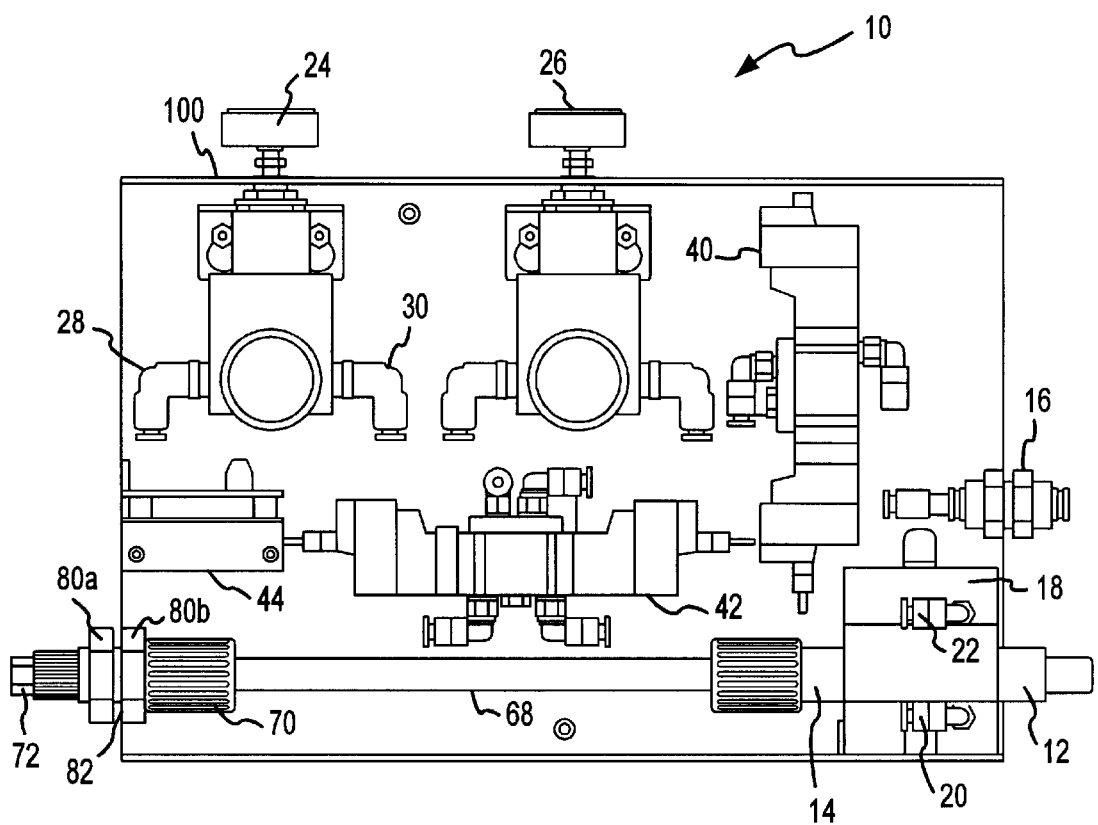
FIG. 1 is a front view of an exemplary embodiment of a fluid metering system of the present invention illustrated without fluid connections.
Figure 2:
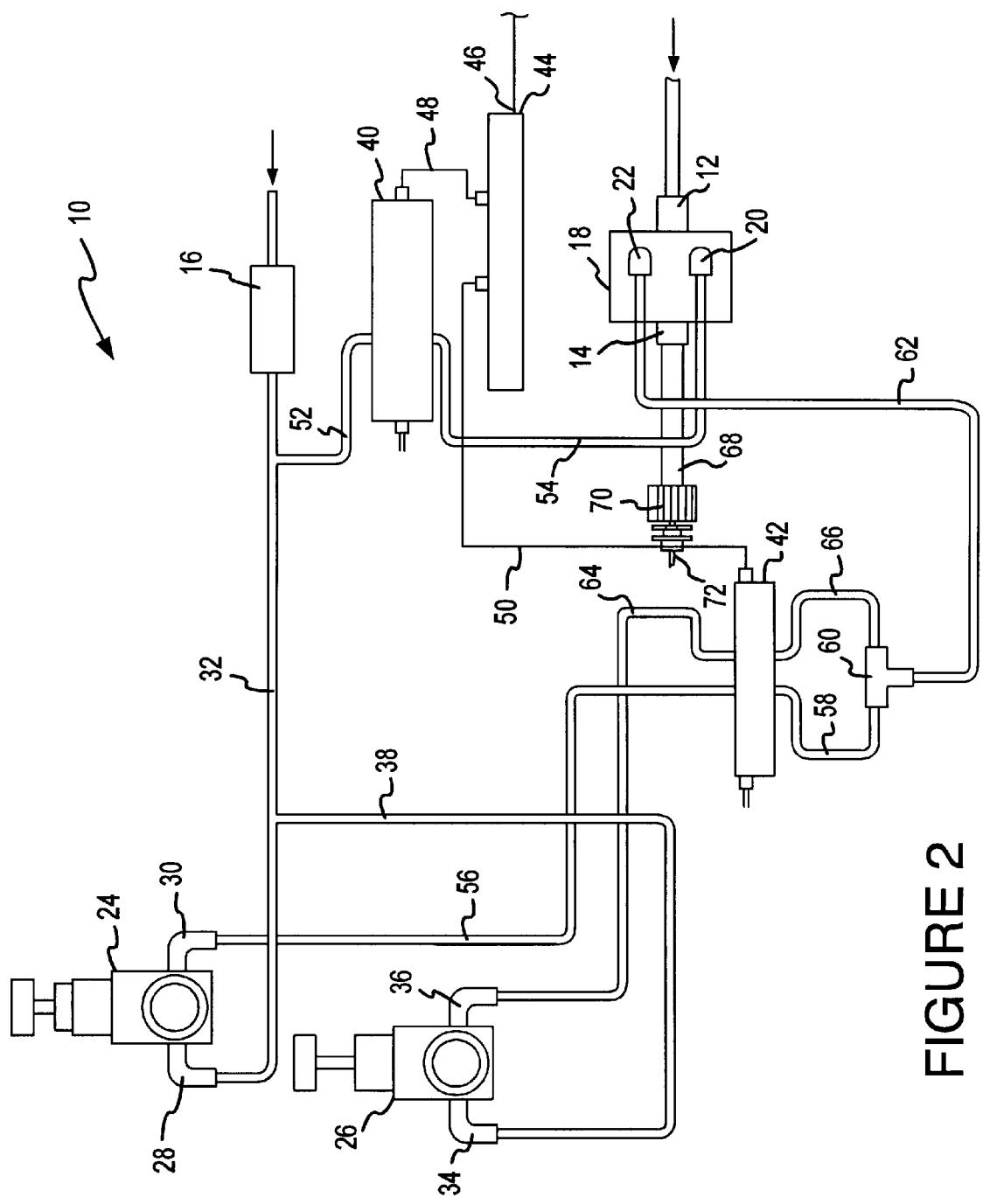
FIG. 2 is a functional illustration of the fluid metering system shown in FIG. 1.

An exemplary embodiment of a fluid metering system 10 of the present invention is illustrated in FIGS. 1 and 2. Fluid metering system 10 is configured to meter the flow of a fluid from a fluid input port 12 to dispense the fluid from an output line 72 at a predetermined flow rate. The fluid may be any liquid, gas or vapor. Fluid metering system 10 may be configured within a housing 100 for convenient mounting to an end application device or any suitable surface.

Fluid metering system 10 is configured to be in fluid communication with an air or gas source (not shown) at air input port 16. The air or gas from the air or gas source (for convenience, hereinafter referred to collectively as the "air" or the "air source") is used to operate the valves of fluid metering system 10.

Fluid input port 12 is in fluid communication with a fluid pressure regulating device 18. Suitable fluid pressure regulating devices include those manufactured by LiQuality under the trademark LiQube™, although it will be appreciated that any suitable fluid pressure regulating device may be used. Fluid pressure regulating device 18 includes an on/off valve 20 and regulator valve 22. Regulator valve 22 is configured to provide an output fluid flow at a fluid output port 14 that is in proportion to a predetermined ratio of the input pressure of the fluid at fluid input port 12 and the air pressure provided to regulator valve 22 from fluid metering system 10. On/off valve may be any type of valve, but is preferably a pneumatic valve configured to switch fluid pressure regulating device 18 "on" when air into on/off valve 20 reaches a preset pressure. When on/off valve 20 receives air at a suitable pressure, it permits regulator valve 22 to effect fluid flow from fluid input port 12 to fluid output port 14.

Fluid metering system 10 also includes at least two regulators, a first pressure regulator 24 and a second pressure regulator 26. First pressure regulator 24 is suitably configured to be set at a first predetermined pressure. First pressure regulator 24 has an input port 28 and an output port 30. Input port 28 is in fluid communication with air input port 16 via an air line 32. Second flow regulator 26 is suitably configured to be set at a second predetermined pressure. Second flow regulator 26 has an input port 34 in fluid communication with air input port 16 via air line 32 and an air line 38. Alternatively, if the first predetermined pressure of first pressure regulator 24 is set higher than the second predetermined pressure of second pressure regulator 26, input port 34 may be in fluid communication with output port 30 of first pressure regulator 24 via air line 38 and an airline 56. Second-pressure regulator 26 also has an output port 36.

Fluid metering system 10 also employs a first solenoid valve 40, a second solenoid valve 42 and an electronic assembly 44. Electronic assembly 44 is connected to a current source (not shown) at its input lead 46 and is configured to produce a first output signal and a second output signal when a corresponding actuator, such as a switch, button or other actuating device, is activated. When an actuator (not shown) is activated, the corresponding output signal is transmitted to first solenoid valve 40 via an electrical connection 48 and is transmitted to second solenoid valve 42 via an electrical connection 50.

First solenoid valve 40 is configured to be switched from an "off" state to an "on" state upon receipt of either the first output signal or the second output signal from electronic assembly 44. While first solenoid valve is shown in FIGS. 1 and 2, and described herein, as a solenoid valve, any pneumatic valve suitable for switching between an "on" state and an "off" state may be employed. First solenoid valve 40 receives air from air input port 16 via air line 32 and an air line 52. When switched to the "on" mode, first solenoid valve 40 permits air to flow to on/off valve 20 via air line 54. When switched to the "off" mode, first solenoid valve 40 prevents air from flowing to on/off valve 20.

Second solenoid valve 42 is preferably a double solenoid valve configuration which suitably opens one of two internal valves upon receipt of either the first output signal or the second output signal from electronic assembly 44. The first internal valve of second solenoid valve 42 receives air from first pressure regulator 24 via air line 56. The second internal valve of second solenoid valve 42 receives air from second pressure regulator 26 via an air line 64. When second solenoid valve 42 receives the first output signal from electronic assembly 44, the first internal valve of second solenoid valve 42 is switched open and the second internal valve is in a closed position. Second solenoid valve 42 then may permit air to flow at the first predetermined pressure set by first pressure regulator 24 to regulator valve 22 via an air line 58, a union "T" 60 and an air line 62. When second solenoid valve 42 receives the second output signal from electronic assembly 44, the second internal valve of second solenoid valve 42 is switched open and the first internal valve is in a closed position. Second solenoid valve 42 then may permit air to flow at the second predetermined pressure set by second pressure regulator 26 to regulator valve 22 via an air line 66, union "T" 60 and air line 62. When regulator valve 22 receives air from second solenoid valve 42, it provides an output fluid pressure at fluid output port 14 that is in proportion to a predetermined ratio of the pressure of the fluid at fluid input port 12 and the air pressure of the air provided to regulator valve 22 from second solenoid valve 42.

Figure 3A:
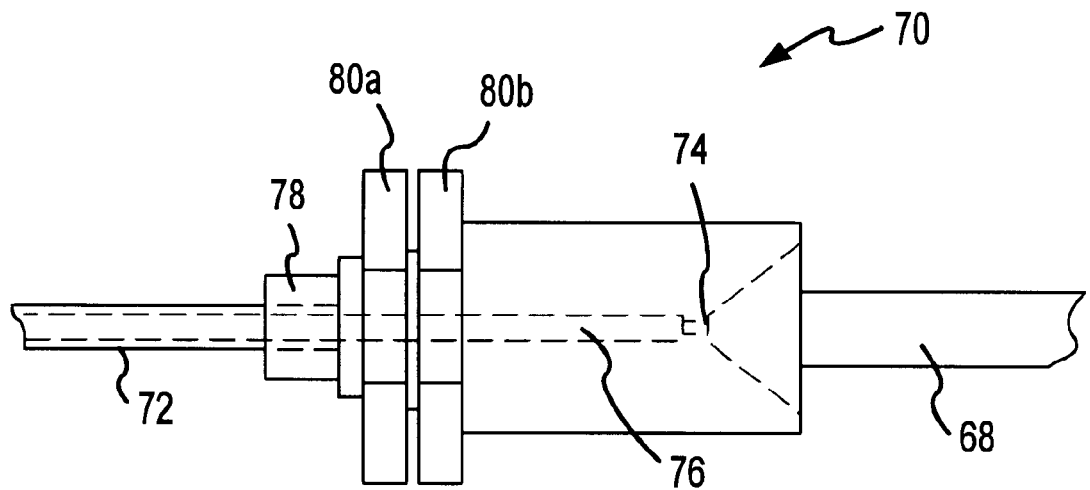
FIG. 3a is a side view of an exemplary embodiment of an orifice fitting of a fluid metering system of the present invention.
Figure 3B:
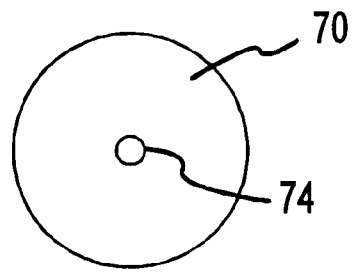

Referring to FIGS. 2, 3a and 3b, to facilitate fluid flow from fluid metering system 10, fluid from fluid output port 14 of fluid pressure regulating device 18 flows through a tube 68 to an orifice fitting 70. Tube 68 is preferably a ⅜-inch OD tube, although it will be appreciated that tube 68 could be of any size suitable for the end application or for the fluid being metered. Orifice fitting 70 is configured to present a restriction in fluid flow, thereby producing a suitable pressure drop to an output line 72 which is connected to a desired application, such as a medical administration device, a semiconductor wafer endpoint detection device and the like.

As fluid flows into orifice fitting 70, it is confronted with a narrowing of the inside diameter of orifice fitting 70 to orifice 74. In the exemplary embodiment of the invention, the inside diameter of orifice 74 is preferably in the range of approximately 0.025 to 0.045 inches, but is most preferably 0.035 inches in diameter. However, it will be appreciated that orifice 74 may be of any size diameter that results in an appropriate pressure drop across orifice fitting 70. The fluid then flows through bore 76 of orifice fitting 70. Output line 72 is in fluid communication with orifice fitting 70 via compression fitting 78. Compression fitting 78 may include any suitable fitting which prevents output line 72 from disengaging from orifice fitting 70, such as the GAL-GRIP™ fitting manufactured by Entegris, Inc. The diameter of output line 72 may be of any size suitable for the end application or the fluid to be metered but is preferably ⅛ inch OD.

Referring back to FIG. 1, orifice fitting 70 may be positioned within a hole 82 of housing 100 and may be attached to housing 100 by any suitable device, such as by lock nuts 80a and 80b which are threaded onto orifice fitting 70 and secure a wall of housing 100 therebetween.

Thus, as is evident from the above description, fluid metering system 10, which employs two regulators, is configured to permit fluid to flow through output line 72 at two different flow rates depending on which actuator of electronic assembly 44 is activated. By activating a first actuator of electronic assembly 44, an operator is able to effect fluid flow at output line 72 at a flow rate proportional to the air pressure from first pressure regulator 24 and the fluid pressure of the fluid at fluid input port 12. By adjusting first pressure regulator 24, an operator is able to increase or decrease the fluid flow rate from output line 72. Similarly, by activating a second actuator of electronic assembly 44, an operator is able to effect fluid flow at a flow rate proportional to the air pressure from second pressure regulator 26 and the fluid pressure of the fluid at fluid input port 12. By adjusting second pressure regulator 26, an operator is able to increase or decrease the fluid flow rate from output line 72. Accordingly, by setting first pressure regulator 24 at a "high" air pressure and second pressure regulator 26 at a "low" air pressure, for example, an operator is able to switch between "high" output fluid flow and "low" output fluid flow at output line 72 by activating a first or second actuator on electronic assembly 44.

While fluid metering system 10 includes two regulators and accordingly is configured to permit fluid to flow through output line 72 at two different flow rates, it will be appreciated that the present invention may employ any number of regulators and thereby effect fluid output at any corresponding number of flow rates. For example, a metering system of the present invention that effects fluid output at three different flow rates would require three actuators resulting in three output signals from the electronic assembly, three regulators and four solenoid valves (with one internal valve of one of the solenoid valves disengaged from the system). Alternatively, one of the solenoid valves could be replaced with a conventional valve device.

Figure 4:
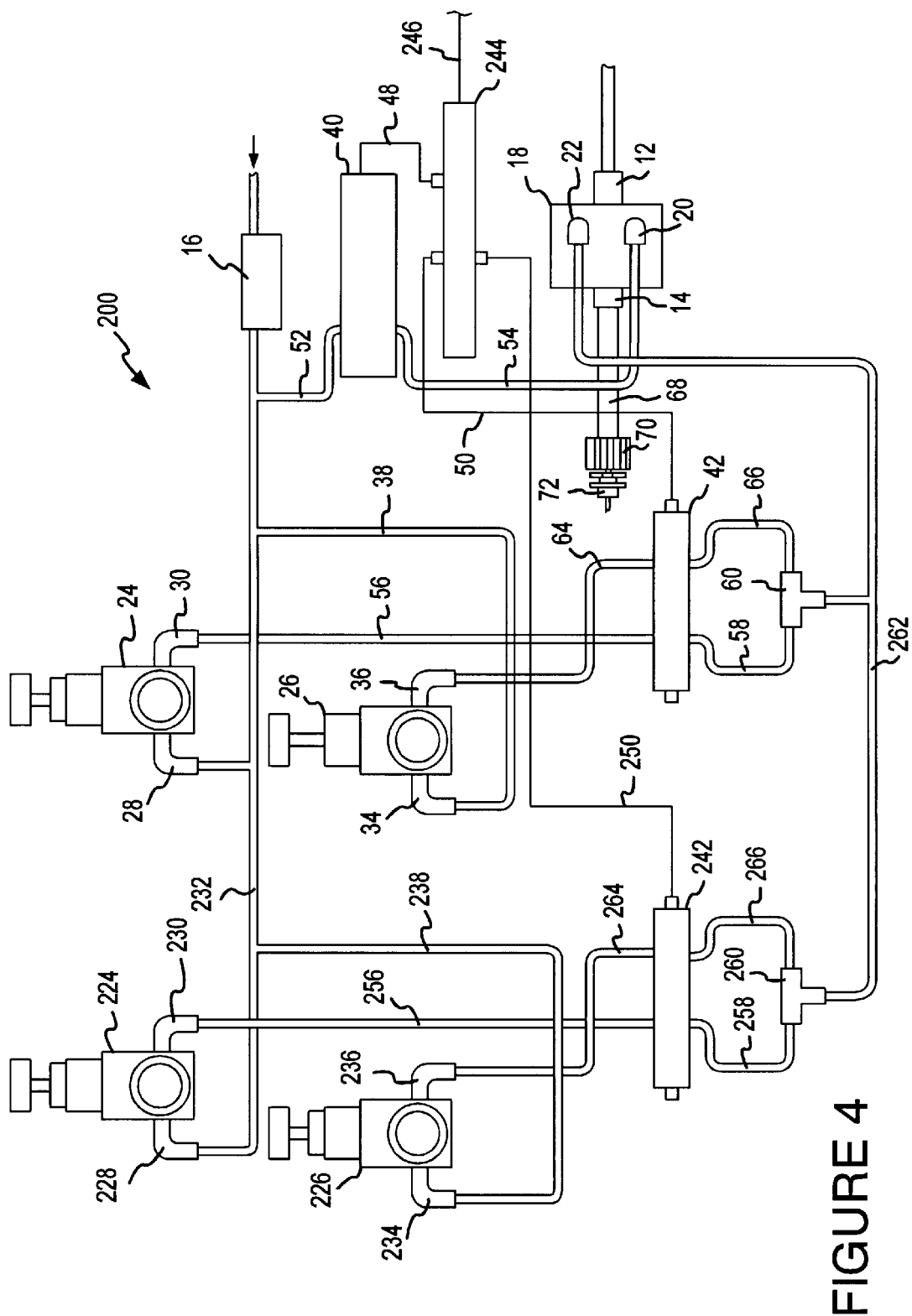
FIG. 4 is a functional illustration of another exemplary embodiment of a fluid metering system of the present invention.

Another exemplary embodiment of the present invention, fluid metering system 200, is illustrated in FIG. 4, where like elements from FIGS. 1 through 3b are designated accordingly. Fluid metering system 200 employs four regulators, first pressure regulator 24, second pressure regulator 26, third pressure regulator 224, and fourth pressure regulator 226. First pressure regulator 24 has an input port 28 and an output port 30 and is suitably configured to be set at a first predetermined pressure. Input port 28 is in fluid communication with air input port 16 via air line 232. Second pressure regulator 26 has an input port 34 in fluid communication with air input port 16 via air line 38 and air line 232. Second pressure regulator 26 has an output port 36 and is configured to be set at a second predetermined pressure. Third pressure regulator 224 has an input port 228 in fluid communication with air input port 16 via air line 232. Third pressure regulator 224 has an output port 230 and is configured to be set at a third predetermined pressure. Fourth pressure regulator 236 has an input port 234 in fluid communication with air input port 16, via air line 232 and an air line 238. Fourth pressure regulator 226 has an output port 236 and is configured to be set at a fourth predetermined pressure. In a preferred embodiment, first, second, third and fourth pressure regulators are adjustable so that an operator may increase or decrease the fluid flow rate from output line 72.

Fluid metering system 200 also employs first solenoid valve 40, second solenoid valve 42, a third solenoid valve 242 and an electronic assembly 244. Electronic assembly 244 is connected to a current source (not shown) at its input lead 246. Electronic assembly 244 includes four actuators, such as switches, buttons or the like, and is configured to produce a first output signal, a second output signal, a third output signal and a fourth output signal when the corresponding actuator is activated. When a first actuator (not shown) is activated, first output signal is transmitted to first solenoid valve 40 via electrical connection 48 and is transmitted to second solenoid valve via electrical connection 50. Similarly, when a second actuator (not shown) is activated, second output signal is transmitted to first solenoid valve 40 via electrical connection 48 and is transmitted to second solenoid valve via electrical connection 50. When a third or fourth actuator (not shown) is activated, third output signal or fourth output signal, respectively, is transmitted to first solenoid valve 40 via electrical connection 48 and is transmitted to third solenoid valve 242 via electrical connection 250.

First solenoid valve 40 is configured to be switched from an "off" state to an "on" state upon receipt of the first, second, third or fourth output signals from electronic assembly 244. First solenoid valve 40 receives air from air input port 16 via air line 232 and air line 52. When switched to the "on" mode, first solenoid valve permits air to flow to on/off valve 20 via air line 54. When switched to the "off" mode, first solenoid valve 40 prevents air from flowing to on/off valve 20.

As discussed above, second solenoid valve 42 is preferably a double solenoid valve configuration which suitably opens one of two internal valves upon receipt of either the first output signal or the second output signal from electronic assembly 244. The first internal valve of second solenoid valve 42 receives air from first pressure regulator 24 via air line 56. The second internal valve of second solenoid valve 42 receives air from second pressure regulator 26 via air line 64. When second solenoid valve 42 receives the first output signal from electronic assembly 244, the first internal valve of second solenoid valve 42 is switched open and the second internal valve is in the closed position. Second solenoid valve 42 then may permit air to flow at the first predetermined pressure set by first pressure regulator 24 to regulator valve 22 via an air line 58, a first union "T" 60 and an air line 262. When second solenoid valve 42 receives the second output signal from electronic assembly 244, the second internal valve of second solenoid valve 42 is switched open and the first internal valve is in the closed position. Second solenoid valve 42 then may permit air to flow at the second predetermined pressure set by second pressure regulator 26 to regulator valve 22 via air line 66, union "T" 60 and air line 262. When regulator valve 22 receives air from second solenoid valve 42, it provides an output fluid flow at fluid output port 14 that is in proportion to a predetermined ratio of the pressure of the fluid at fluid input port 12 and the pressure of the air provided to regulator valve 22 from second solenoid valve 42.

Third solenoid valve 242 also is preferably a double solenoid valve configuration which suitably opens one of two internal valves upon receipt of either the third output signal or the fourth output signal from electronic assembly 244. The first internal valve of third solenoid valve 242 receives air from third pressure regulator 224 via an air line 256. The second internal valve of third solenoid valve 242 receives air from fourth pressure regulator 226 via an air line 264. When third solenoid valve 42 receives the third output signal from electronic assembly 244, the first internal valve of third solenoid valve 242 is switched open and the second internal valve is in the closed position. Third solenoid valve 242 then permits air to flow at the third predetermined pressure set by third pressure regulator 242 to regulator valve 22 via an air line 258, a second union "T" 260 and air line 262. When third solenoid valve 242 receives the fourth output signal from electronic assembly 244, the second internal valve of third solenoid valve 242 is switched open and the first internal valve is in the closed position. Third solenoid valve 242 then permits air to flow at the fourth predetermined pressure set by fourth pressure regulator 226 to regulator valve 22 via an air line 266, union "T" 60 and air line 262. When regulator valve 22 receives air from third solenoid valve 242, it provides an output fluid flow at fluid output port 14 that is in proportion to a predetermined ratio of the pressure of the fluid at fluid input port 12 and the pressure of the air provided to regulator valve 22 from third solenoid valve 242. From fluid output port 14, the fluid flows through tube 68 to orifice fitting 70 and eventually through output line 72.

Accordingly, fluid metering system 200, which employs four regulators, is configured to permit fluid to flow through output line 72 at four different flow rates depending on which actuator of electronic assembly 244 is activated. By activating a first actuator of electronic assembly 244, an operator is able to effect fluid flow at output line 72 at a flow rate proportional to the air pressure from first pressure regulator 24 and the fluid pressure of the fluid at fluid input port 12. By activating a second actuator of electronic assembly 244, an operator is able to effect fluid flow at output line 72 at a flow rate proportional to the air pressure from second pressure regulator 26 and the fluid pressure of the fluid at fluid input port 12. By activating a third actuator of electronic assembly 244, an operator is able to effect fluid flow at output line 72 at a flow rate proportional to the air pressure from third pressure regulator 224 and the fluid pressure of the fluid at fluid input port 12. By activating a fourth actuator of electronic assembly 244, an operator is able to effect fluid flow at output line 72 at a flow rate proportional to the air pressure from fourth pressure regulator 226 and the fluid pressure of the fluid at fluid input port 12. By adjusting first, second, third or fourth pressure regulators, an operator is further able to increase or decrease the fluid flow rate from output line 72.

As may be appreciated from the above description, a fluid metering apparatus of the present invention may be configured for the delivery of the fluid from an output line at an $N_i$ delivery flow rate, where N is any integer greater than 1 and i is any integer from 1 to N. Such an apparatus may include an air input port for receiving a gas and N regulators. Each $N_i$ regulator has an input port which is in fluid communication with the air input port via an airline. Each $N_i$ regulator also has an output port and is suitably configured to be set at a corresponding predetermined pressure. In a preferred embodiment of the present invention, each $N_i$ regulator is adjustable so that an operator may increase or decrease the predetermined pressure to increase or decrease the fluid flow rate from the output line.

The apparatus also includes an activation valve, N valves, and an electronic assembly. The electronic assembly is connected to a current source at an input lead. The electronic assembly has $N_i$ actuators, such as switches, buttons or the like, and is configured to produce N output signals, each $N_i$ signal which corresponds with an $N_i$ actuator. When an $N_i$ actuator is activated, the corresponding $N_i$ output signal is transmitted to the activation valve via an electrical connection and is transmitted to an $N_i$ valve via another electrical connection.

The activation valve is configured to be switched from an "off" state to an "on" state upon receipt of an $N_i$ output signal from the electronic assembly. The activation valve receives air from the air input port via air lines. When switched to the "on" mode, the activation valve permits air to flow to an on/off valve of a fluid pressure regulating device via an air line. When switched to the "off" mode, the activation valve prevents air from flowing to the on/off valve.

Each $N_i$ valve receives air from the corresponding $N_i$ regulator via an air line. When an $N_i$ valve receives a corresponding $N_i$ output signal from the electronic assembly, the $N_i$ valve is opened. The $N_i$ valve then permits air to flow to a regulator valve of the fluid pressure regulating device at an $N_i$ predetermined pressure set by the corresponding $N_i$ regulator. When the regulator valve receives air from the $N_i$ valve, it provides output fluid flow at the fluid output port that is in proportion to a predetermined ratio of the pressure of the fluid at the fluid input port and the $N_i$ predetermined pressure set by the $N_i$ regulator which is in fluid communication with the $N_i$ valve from which the regulator valve receives air.

Accordingly, the above-described embodiment of the fluid metering system of the present invention, which employs N regulators, is configured to permit fluid to flow through the output line at N different flow rates depending on which one of the N actuators of the electronic assembly is activated. By adjusting the regulators, the operator is further able to increase or decrease the fluid flow rate at the output line.

Although the subject invention has been described herein in conjunction with the appended drawing Figures, it will be appreciated that the scope of the invention is not so limited. Various modifications in the arrangement of the components discussed and the steps described herein for using the subject device may be made without departing from the spirit and scope of the invention as set forth in the appended claims.

I claim:

1. A fluid metering apparatus for the delivery of a fluid at a desired flow rate, said apparatus comprising:
   (a) a gas inlet for receiving a gas;
   (b) a first regulator in fluid communication with said gas inlet and configured to receive said gas from said gas inlet and emit said gas at a first gas pressure;
   (c) a second regulator in fluid communication with said gas inlet and configured to receive said gas from said gas inlet and emit said gas at a second gas pressure;
   (d) a first valve in fluid communication with said first regulator;
   (e) a second valve in fluid communication with said second regulator;
   (f) a switch mechanism connected to said first valve and said second valve and having a first actuator and a second actuator, wherein said switch mechanism causes said first valve to be open and said second valve to be closed when said first actuator is actuated and causes said second valve to be open and said first valve to be closed when said second actuator is actuated;
   (g) a fluid pressure regulating device having:
      i. a fluid inlet port configured to receive a fluid to be metered, wherein said fluid has a fluid inlet pressure;
      ii. a gas inlet port in fluid communication with said first valve and said second valve; and
      iii. a fluid outlet port,
   wherein, when said first actuator of said switch mechanism is actuated, said fluid pressure regulating device is configured to deliver said fluid to said fluid outlet port at a first device outlet flow rate which is proportional to a predetermined ratio of said fluid inlet pressure and said first gas pressure and wherein, when said second actuator of said switch mechanism is actuated, said fluid pressure regulating device is configured to deliver said fluid to said fluid outlet port at a second device outlet flow rate which is proportional to a predetermined ratio of said fluid inlet pressure and said second gas pressure;
   (h) a fluid outlet; and
   (i) an orifice fitting in fluid communication with said fluid outlet port and configured to effect a pressure drop between said fluid outlet port and said fluid outlet.

2. The apparatus of claim 1 further comprising a fluid flow activation device which is configured to permit said fluid to flow from said fluid inlet port to said fluid outlet port when one of said first actuator and said second actuator is actuated.

3. The apparatus of claim 2 wherein said fluid flow activation device comprises an activation valve in fluid communication with said gas inlet and said fluid pressure regulating device and wherein said activation valve is opened when one of said first actuator and said second actuator is actuated.

4. The apparatus of claim 3 wherein said switch mechanism comprises an electronic assembly which is configured to transmit a first electronic signal to said first valve when said first actuator is actuated and to transmit a second electronic signal to said second valve when said second actuator is actuated.

5. The apparatus of claim 4 wherein said electronic assembly transmits said first electronic signal to said activation valve when said first actuator is actuated and said second electronic signal to said activation valve when said second actuator is actuated.

6. The apparatus of claim 3 wherein said activation valve comprises an internal valve of a solenoid valve.

7. The apparatus of claim 1 wherein said switch mechanism comprises an electronic assembly which is configured to transmit a first electronic signal to said first valve when said first actuator is actuated and to transmit a second electronic signal to said second valve when said second actuator is actuated.

8. The apparatus of claim 1 wherein said first valve comprises an internal valve of a solenoid valve.

9. The apparatus of claim 1 wherein said second valve comprises an internal valve of a solenoid valve.

10. The apparatus of claim 1 wherein said first regulator is adjustable so that said first gas pressure may be adjusted to a desired pressure.

11. The apparatus of claim 1 wherein said second regulator is adjustable so that said second gas pressure may be adjusted to a desired pressure.

12. A fluid metering apparatus for the delivery of a fluid at a desired flow rate, said apparatus comprising:
   (a) a gas inlet;
   (b) a first regulator in fluid communication with said gas inlet and configured to receive a gas from said gas inlet and emit said gas from a first regulator gas outlet at a first gas pressure;
   (c) a second regulator in fluid communication with said first regulator gas outlet and configured to receive said gas from said first regulator gas outlet and emit said gas at a second gas pressure, wherein said first gas pressure is higher than said second gas pressure;
   (d) a first valve in fluid communication with said first regulator;
   (e) a second valve in fluid communication with said second regulator;
   (f) a switch mechanism connected to said first valve and said second valve and having a first actuator and a second actuator, wherein said switch mechanism causes said first valve to be open and said second valve to be closed when said first actuator is actuated and causes said second valve to be open and said first valve to be closed when said second actuator is actuated;
   (g) a fluid pressure regulating device having:
      i. a fluid inlet port configured to receive a fluid to be metered, wherein said fluid has a fluid inlet pressure;
      ii. a gas inlet port in fluid communication with said first valve and said second valve; and
      iii. a fluid outlet port,
   wherein when said first actuator of said switch mechanism is actuated, said fluid pressure regulating device is configured to deliver said fluid to said fluid outlet port at a first device outlet flow rate which is proportional to a predetermined ratio of said fluid inlet pressure and said first gas pressure and wherein, when said second actuator of said switch mechanism is activated, said fluid pressure regulating device is configured to deliver said fluid to said fluid outlet port at a second device outlet flow rate which is proportional to a predetermined ratio of said fluid inlet pressure and said second gas pressure;
   (h) a fluid outlet; and
   (i) an orifice fitting in fluid communication with said fluid outlet port and configured to effect a pressure drop between said fluid outlet port and said fluid outlet.

13. The apparatus of claim 12 further comprising a fluid activation device which is configured to permit said fluid to flow from said fluid inlet port to said fluid outlet port when one of said first actuator and said second actuator is actuated.

14. The apparatus of claim 13 wherein said fluid activation device comprises an activation valve in fluid communication with said gas inlet and said fluid pressure regulating device and wherein said activation valve is opened when one of said first actuator and said second actuator is actuated.

15. The apparatus of claim 14 wherein said switch mechanism comprises an electronic assembly which is configured to transmit a first electronic signal to said first valve when said first actuator is actuated and to transmit a second electronic signal to said second valve when said second actuator is actuated.

16. The apparatus of claim 15 wherein said electronic assembly transmits said first electronic signal to said activation valve when said first actuator is actuated and said second electronic signal to said activation valve when said second actuator is activated.

17. The apparatus of 14 wherein said activation valve comprises an internal valve of a solenoid valve.

18. The apparatus of claim 12 wherein said switch mechanism comprises an electronic assembly which is configured to transmit a first electronic signal to said first valve when said first actuator is actuated and to transmit a second electronic signal to said second valve when said second actuator is actuated.

19. The apparatus of claims 12 wherein said first valve comprises an internal valve of a solenoid valve.

20. The apparatus of claim 12 wherein said second valve comprises an internal valve of a solenoid valve.

21. The apparatus of claim 12 wherein said first regulator is adjustable so that said first gas pressure may be adjusted to a desired pressure.

22. The apparatus of claim 12 wherein said second regulator is adjustable so that said second gas pressure may be adjusted to a desired pressure.

23. A fluid metering apparatus for the delivery of a fluid at an $N_i$ delivery flow rate, wherein N is any integer greater than 1 and i is any integer from 1 to N, said apparatus comprising:
    (a) a gas inlet for receiving a gas;
    (b) N regulators, wherein each said $N_i$ regulator is in fluid communication with said gas inlet and is configured to emit said gas at a corresponding $N_i$ gas pressure;
    (c) N valves wherein each $N_i$ valve is in fluid communication with a corresponding $N_i$ regulator;
    (d) a switch mechanism connected to each valve and having N actuators, wherein said switch mechanism opens an $N_i$ valve and closes the remaining valves when a corresponding $N_i$ actuator is actuated;
    (e) a fluid pressure regulating device having:
        (i) a fluid inlet port configured to receive a fluid to be metered, wherein said fluid has a fluid inlet pressure;
        (ii) a gas inlet port in fluid communication with each valve; and
        (iii) a fluid outlet port,
    wherein, when an $N_i$ actuator of said switch mechanism is actuated, said fluid pressure regulating device is configured to deliver said fluid to said fluid outlet port at a device outlet flow rate which is proportional to a predetermined ratio of said fluid inlet pressure and an $N_i$ gas pressure, which $N_i$ gas pressure corresponds to an $N_i$ actuator;
    (f) a fluid outlet configured to emit said fluid at an $N_i$ delivery flow rate; and
    (g) an orifice fitting in fluid communication with said fluid outlet port and configured to effect a pressure drop between said fluid outlet port and said fluid outlet.

24. The apparatus of claim 23 further comprising a fluid activation device which is configured to permit said fluid to flow from said fluid inlet port to said fluid outlet port when an $N_i$ actuator is actuated.

25. The apparatus of claim 24 wherein said fluid activation device comprises an activation valve in fluid communication with said gas inlet and said fluid pressure regulating device and wherein activation valve is opened when an $N_i$ actuator is actuated.

26. The apparatus of claim 25 wherein said switch mechanism comprises an electronic assembly which is configured to transmit an $N_i$ electronic signal to a corresponding $N_i$ valve when a corresponding $N_i$ actuator is actuated.

27. The apparatus of claim 26 wherein said electronic assembly transmits an $N_i$ electronic signal to said activation valve when a corresponding $N_i$ actuator is actuated.

28. The apparatus of claim 23 wherein said switch mechanism comprises an electronic assembly which is configured to transmit an $N_i$ electronic signal to a corresponding $N_i$ valve when a corresponding $N_i$ actuator is actuated.

* * * * *